(12) United States Patent
Yokoyama et al.

(10) Patent No.: US 12,304,294 B2
(45) Date of Patent: May 20, 2025

(54) IN-VEHICLE BATTERY ATTACHMENT STRUCTURE

(71) Applicant: SUBARU CORPORATION, Tokyo (JP)

(72) Inventors: Yutaka Yokoyama, Tokyo (JP); Shinichi Kimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 407 days.

(21) Appl. No.: 17/687,101

(22) Filed: Mar. 4, 2022

(65) Prior Publication Data

US 2022/0305899 A1    Sep. 29, 2022

(30) Foreign Application Priority Data

Mar. 23, 2021   (JP) .................................. 2021-049024

(51) Int. Cl.
*B60K 1/04*     (2019.01)
*H01M 50/249*   (2021.01)

(52) U.S. Cl.
CPC ............. *B60K 1/04* (2013.01); *H01M 50/249* (2021.01); *B60K 2001/0433* (2013.01); *H01M 2220/20* (2013.01)

(58) Field of Classification Search
CPC ............. B60K 1/04; B60K 2001/0433; H01M 50/249; H01M 2220/20
See application file for complete search history.

(56) References Cited

U.S. PATENT DOCUMENTS

| | | | |
|---|---|---|---|
| 10,118,475 B2 * | 11/2018 | Sugizaki | |
| 10,486,514 B2 * | 11/2019 | Takayanagi | |
| 10,688,854 B2 * | 6/2020 | Caliskan | |

FOREIGN PATENT DOCUMENTS

| | | |
|---|---|---|
| CN | 103204053 A | 7/2013 |
| JP | H09-226632 A | 9/1997 |
| JP | 2004-345447 A | 12/2004 |
| JP | 2014-144775 A | 8/2014 |
| JP | 2017-165301 A | 9/2017 |
| JP | 2020-023277 A | 2/2020 |

OTHER PUBLICATIONS

Japanese Office Action in JPA No. 2021-049024 issued on Decemebr 3, 2024 with English translation thereof.

* cited by examiner

*Primary Examiner* — James A Shriver, II
*Assistant Examiner* — Nicholas R. Kandas
(74) *Attorney, Agent, or Firm* — MCGINN I.P. LAW GROUP, PLLC (57) ABSTRACT

An in-vehicle battery attachment structure is to be disposed under a rear seat of the vehicle. The in-vehicle battery attachment structure includes at least one left battery module and at least one right battery module, a housing case, and a battery frame. The at least one left battery module and the at least one right battery module are to be disposed apart from each other in a left-right direction of the vehicle. The housing case houses the at least one left battery module and the at least one right battery module. The at least one left battery module, the at least one right battery module, and the housing case are attached to the battery frame in a suspended state. The battery frame is to be fixed to a vehicle body of the vehicle. The rear seat is attached to the battery frame.

18 Claims, 12 Drawing Sheets

IN-VEHICLE BATTERY ATTACHMENT STRUCTURE

CROSS-REFERENCE TO RELATED APPLICATIONS

The present application claims priority from Japanese Patent Application No. 2021-049024 filed on Mar. 23, 2021, the entire contents of which are hereby incorporated by reference.

BACKGROUND

The disclosure relates to a technical field of an in-vehicle battery attachment structure to be mounted on a vehicle such as an automobile.

An in-vehicle battery for supplying electric power to a motor and various electrical components is mounted on various vehicles such as automobiles (see Japanese Unexamined Patent Application Publication (JP-A) Nos. 2020-23277 and 2004-345447).

In recent years, vehicles such as electric vehicles and hybrid electric vehicles have been widely used. These electric-powered vehicles are equipped with high-capacity in-vehicle batteries.

The in-vehicle battery is provided with a housing case and a battery module housed in the housing case. For example, a plurality of battery cells (secondary batteries) such as nickel hydrogen batteries and lithium ion batteries are disposed in the battery module.

An in-vehicle battery described in JP-A No. 2020-23277 is surrounded by a frame structure that is attached to a vehicle body under a rear seat and formed by joining a plurality of pipes to one another. The rear seat is attached to an upper side of the frame structure.

An in-vehicle battery described in JP-A No. 2004-345447 is disposed between a pair of seats, and a housing case is attached to a cross member or the like constituting a part of a vehicle body.

SUMMARY

An aspect of the disclosure provides an in-vehicle battery attachment structure to be applied to a vehicle. The in-vehicle battery attachment structure is to be disposed is located under a rear seat of the vehicle. The in-vehicle battery attachment structure includes at least one left battery module and at least one right battery module, a housing case, and a battery frame. The at least one left battery module and the at least one right battery module are to be disposed apart from each other in a left-right direction of the vehicle. The housing case houses the at least one left battery module and the at least one right battery module. The at least one left battery module, the at least one right battery module, and the housing case are attached to the battery frame in a suspended state. The battery frame is to be fixed to a vehicle body. The rear seat is attached to the battery frame of the vehicle.

BRIEF DESCRIPTION OF THE DRAWINGS

FIG. 4 is an enlarged perspective view illustrating a part of the battery frame and the like.

DETAILED DESCRIPTION

In a vehicle, it is necessary to enhance a function of protecting an in-vehicle battery and an occupant in case of collision or the like.

Further, in an in-vehicle battery to be mounted on an electric vehicle or the like, a plurality of battery modules may be disposed in a housing case in order to ensure a high capacity. Arrangement of the plurality of battery modules may particularly lead to an increase in the weight and a decrease in fuel economy. Therefore, it is also necessary to simplify a structure of the vehicle in order to reduce the increase in the weight.

Therefore, it is desirable to enhance a function of protecting an in-vehicle battery and an occupant while simplifying a structure.

Schematic Configuration of Vehicle

Figure 1:
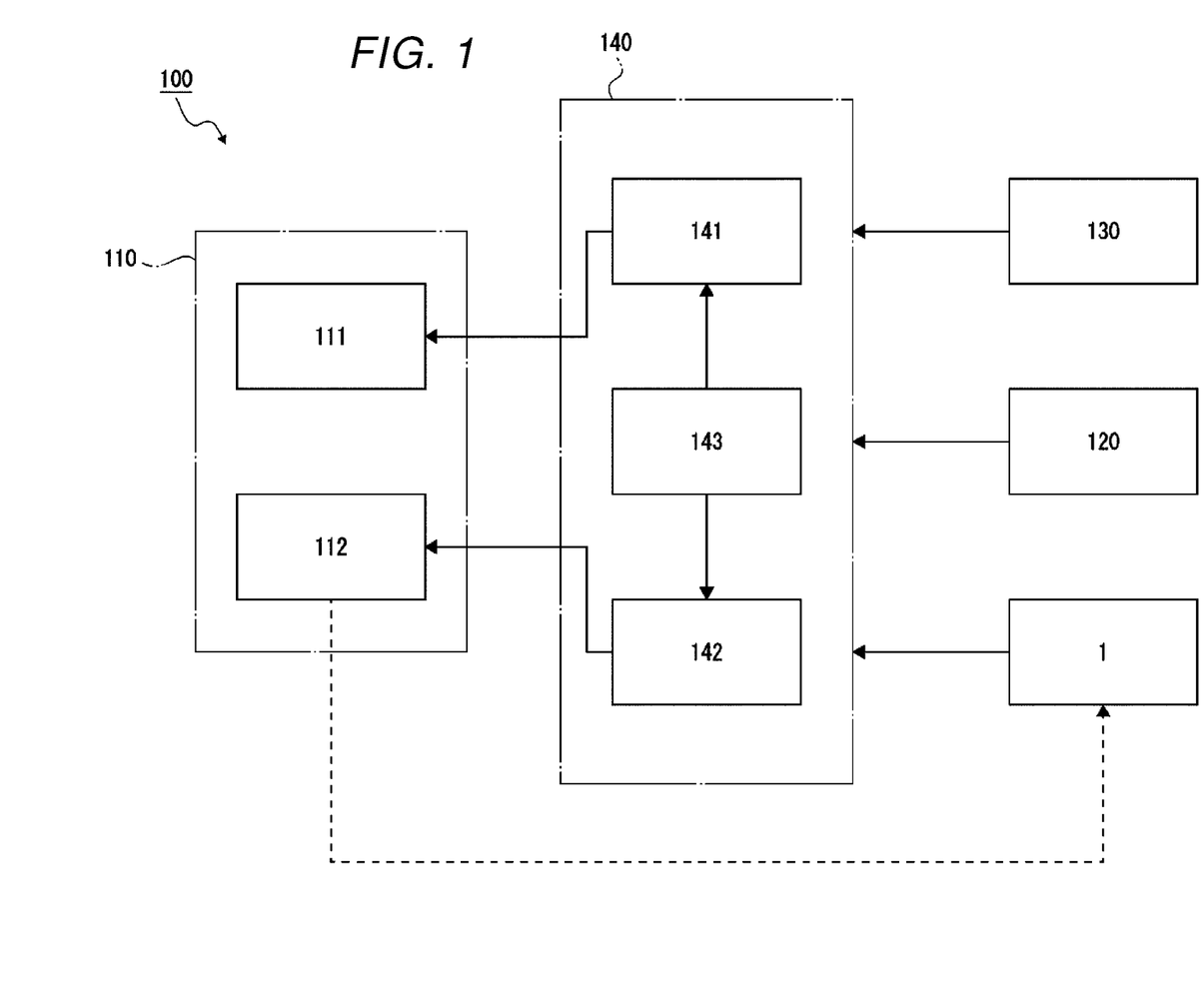
FIG. 1 is a diagram illustrating an embodiment of an in-vehicle battery attachment structure according to the disclosure together with FIGS. 2 to 12, and is a diagram illustrating a configuration of a vehicle.

First, a schematic configuration of a vehicle on which an in-vehicle battery according to the disclosure is mounted will be described (see FIG. 1).

A vehicle 100 is, for example, a hybrid vehicle that travels by at least one of fuel (gasoline) power or electric power. However, the vehicle 100 may be an electric vehicle that travels by electric power alone.

The vehicle 100 includes a power source 110, an accelerator opening degree sensor 120, a speed sensor 130, a controller 140, and an in-vehicle battery 1.

As the power source 110, an engine 111 (internal combustion engine) and a drive motor 112 (electric motor) are provided. Therefore, the vehicle 100 is set with two travel modes, that is, a hybrid travel mode in which both the engine 111 and the drive motor 112 are used as the power and a motor travel mode in which the drive motor 112 is used as the power alone. The two travel modes are switched according to traveling conditions and the like. However, the vehicle 100 may also be set with an engine travel mode in which the engine 111 is used as the power alone.

The accelerator opening degree sensor 120 detects an accelerator opening degree corresponding to a driving force of the vehicle 100 requested by a driver, that is, a depression amount of an accelerator pedal by the driver. The accelerator opening degree detected by the accelerator opening degree sensor 120 is output to the controller 140 as a detection signal.

The speed sensor 130 detects a speed of the vehicle 100. The speed of the vehicle 100 detected by the speed sensor 130 is output to the controller 140 as a detection signal.

The controller 140 has a function of comprehensively controlling an operation of each unit in the vehicle 100 and performing various types of arithmetic processing. The controller 140 includes a microprocessor that performs an arithmetic operation, a read only memory (ROM) that stores a programs for causing the microprocessor to execute each processing, a random access memory (RAM) that stores various types of data such as an arithmetic operation result, an interface for inputting or outputting data, and the like.

The controller 140 includes an engine controller 141 that controls the engine 111, a motor controller 142 that controls the drive motor 112, and a mode switching unit 143.

The engine controller 141 operates as an engine control unit (ECU). The motor controller 142 has a function of, for example, controlling a driving operation of wheels of the vehicle 100 by the drive motor 112, a regenerative operation in the drive motor 112, and the like. The mode switching unit 143 switches, based on the speed, an acceleration, and the like of the vehicle 100, between the two travel modes, that is, the hybrid travel mode in which both the engine 111 and the drive motor 112 are used as the power and the motor travel mode in which the drive motor 112 is used as the power alone.

The in-vehicle battery 1 includes a plurality of battery modules that store electric power used in the vehicle 100, for example, electric power used in the drive motor 112, as well as electric power used in the controller 140, each unit operated by electric power in the vehicle 100, various illuminations provided in the vehicle 100, and the like. Examples of a battery of the battery modules include a secondary battery such as a nickel hydrogen battery and a lithium ion battery. In addition to electric power obtained by charging from an outside of the vehicle 100 (charging electric power), for example, regenerative electric power supplied from the drive motor 112 is stored in the in-vehicle battery 1.

Schematic Configuration of Vehicle Body

Figure 2:
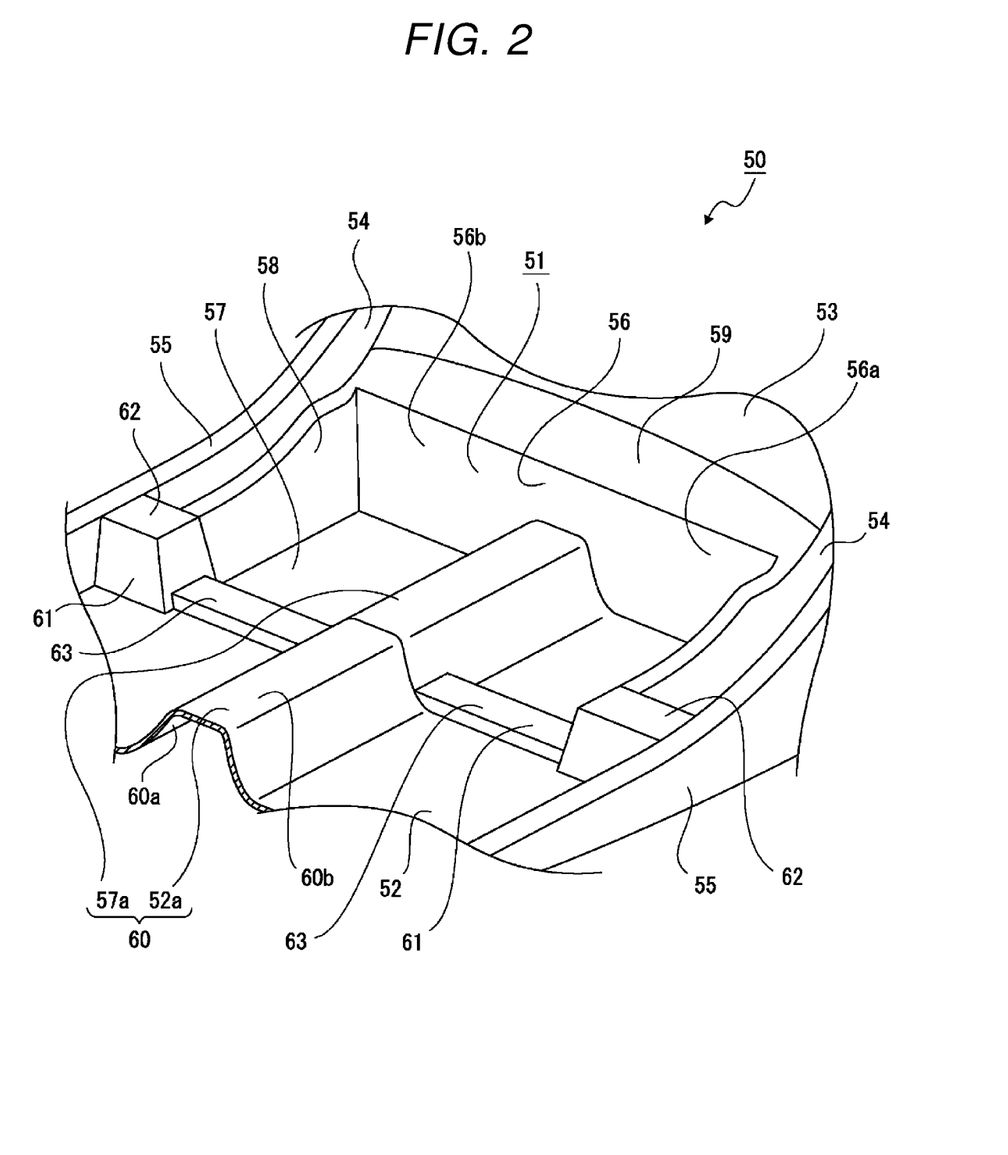
FIG. 2 is a perspective view illustrating a part of a vehicle body.

Next, a schematic configuration of a lower side of a rear portion of a vehicle body 50 will be described (see FIG. 2).

The vehicle body 50 includes a floor pan 51, a front floor panel 52, a rear floor panel 53, side frames 54, 54, and side sills 55, 55.

The floor pan 51 is a portion located under a rear seat (described below). The floor pan 51 has an arrangement recessed portion 56 opening forward and upward. The arrangement recessed portion 56 includes a bottom surface portion 57 oriented substantially in an up-down direction, and a peripheral surface portion 58 continuous with a peripheral edge of the bottom surface portion 57. The floor pan 51 is provided with an upper portion 59 continuous with an upper edge of the peripheral surface portion 58. A center portion of the bottom surface portion 57 in a left-right direction is provided as a protruding portion 57a protruding upward. The protruding portion 57a is formed in a tunnel shape having a space opening downward, forward and rearward. Therefore, the arrangement recessed portion 56 has spaces on left and right sides of the protruding portion 57a, and the spaces are formed as a first portion 56a and a second portion 56b, respectively.

The front floor panel 52 is provided continuously to a front side of the floor pan 51, and a center portion thereof in the left-right direction is provided as a protruding portion 52a protruding upward. The protruding portion 52a is formed in a tunnel shape having a space opening downward, forward and rearward. A rear end of the protruding portion 52a is continuous with a front end of the protruding portion 57a in the bottom surface portion 57. The vehicle body 50 is provided with a tunnel-shaped raised portion 60 configured with the protruding portion 52a and the protruding portion 57a, and an internal space of the raised portion 60 is formed as an arrangement space 60a.

The rear floor panel 53 is continuous with a rear side of the floor pan 51, and is continuous with the upper portion 59 of the floor pan 51.

The side frames 54, 54 are respectively located on a left side and a right side of the floor pan 51 and the rear floor panel 53, and are continuous with left and right side edges of the floor pan 51 and left and right side edges of the rear floor panel 53.

The side sills 55, 55 are respectively located on left and right sides of the front floor panel 52 and the side frames 54, 54, and are continuous with left and right side edges of the front floor panel 52 and outer side edges of the side frames 54, 54.

cross members 61, 61 are spaced apart from each other in the left-right direction, and fixed to portions where the floor pan 51, the side frames 54, 54, and the front floor panel 52 are continuous with one another. Each cross member 61 includes a base portion 62 provided as an outer end portion in the left-right direction, and a front portion 63 protruding laterally from a lower end portion of the base portion 62, extending in the left-right direction, and located in front of the housing case (described below) of the in-vehicle battery 1. An upper surface of the base portion 62 is higher than an upper surface of the front portion 63. The cross members 61, 61 are respectively located between the protruding portion 57a of the floor pan 51 and the side sills 55, 55. The base portions 62, 62 are fixed to the floor pan 51 and the side frames 54, 54 by welding or the like in a state in which the base portions 62, 62 are located in front of the side frames 54, 54, respectively.

The vehicle 100 is provided with a power transmission mechanism (not illustrated) including a propeller shaft and the like for transmitting the power from the engine 111 and the like to the wheels. The propeller shaft is at least partially disposed in the arrangement space 60a of the raised portion 60 on a lower surface side of the vehicle body 50. The arrangement space 60a of the raised portion 60 is also provided with, for example, a discharge pipe (not illustrated) for discharging gas during traveling of the vehicle 100.

Attachment Structure of In-Vehicle Battery

Next, an attachment structure of the in-vehicle battery 1 will be described (see FIGS. 3 to 8).

Figure 3:
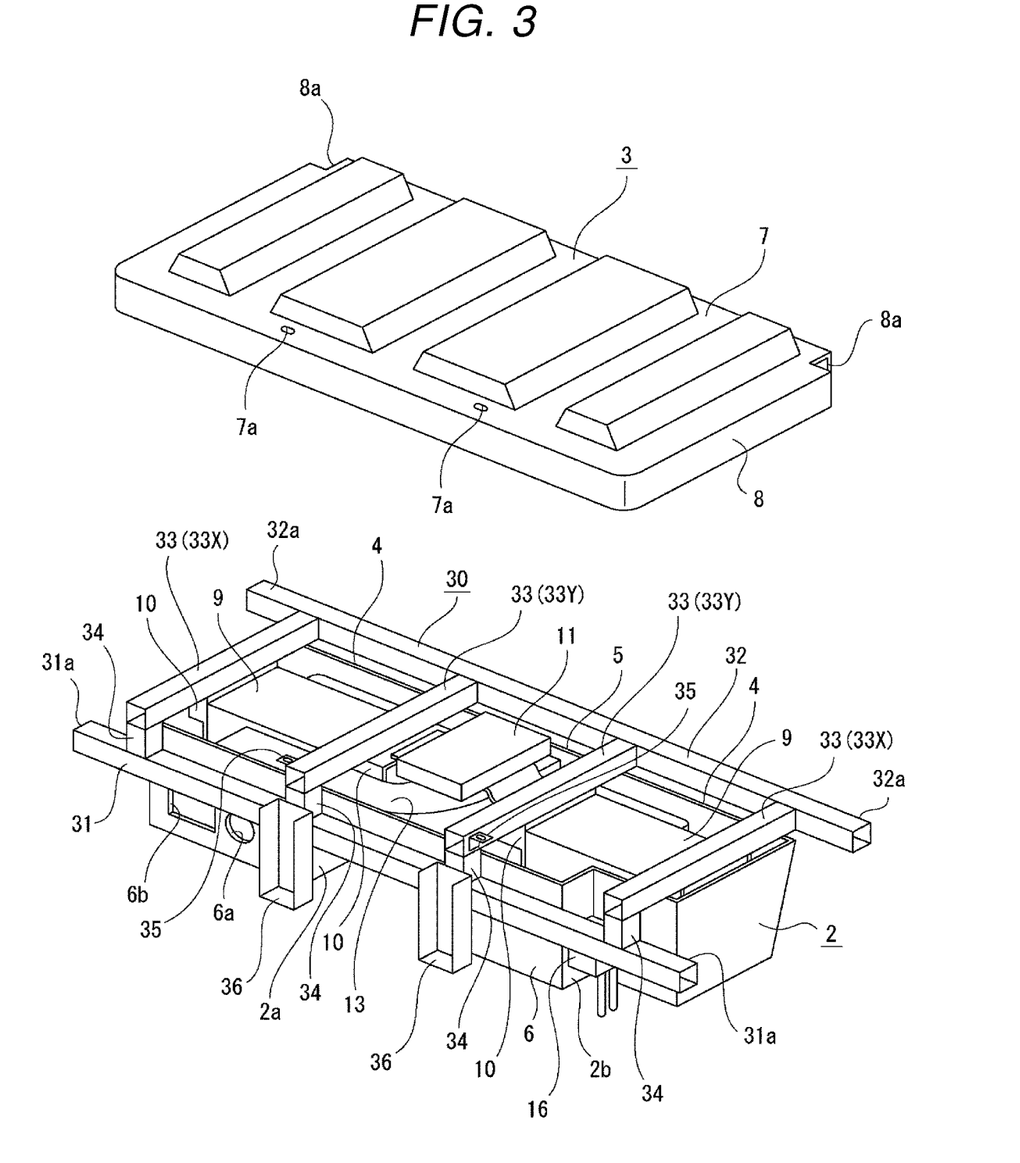
FIG. 3 is a perspective view illustrating an in-vehicle battery and a battery frame in a state in which a cover is separated.
Figure 4:
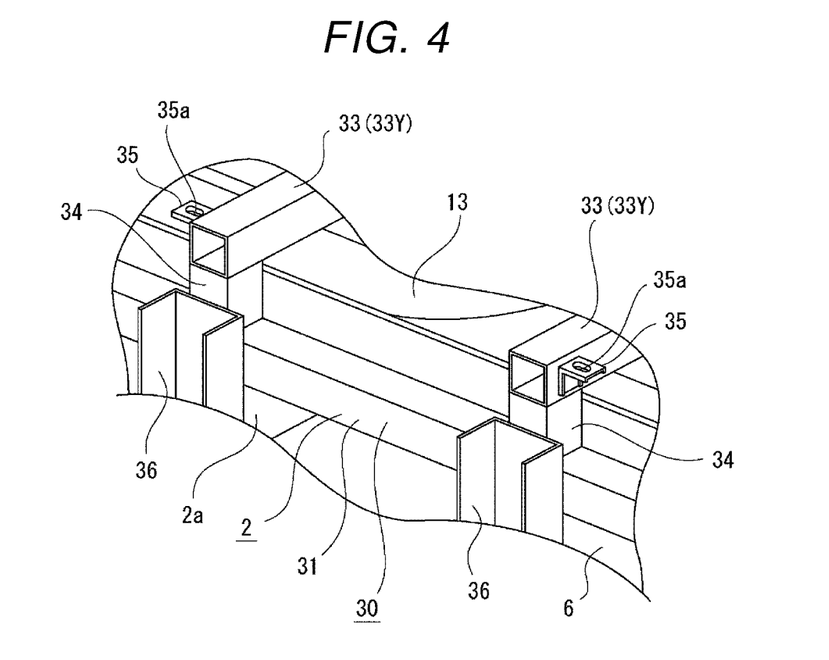

The in-vehicle battery 1 is attached to and held by a battery frame 30 (see FIG. 3). The battery frame 30 is formed of a metal material having a high strength, and includes a first frame bar 31 extending in the left-right direction, a second frame bar 32 extending in the left-right direction, third frame bars 33, 33, . . . extending in a front-rear direction, and coupling portions 34, 34, . . . coupling the third frame bars 33, 33, . . . to the first frame bar 31.

The first frame bar 31 and the second frame bar 32 are located apart from each other in the front-rear direction, and the first frame bar 31 on the front side is located slightly below the second frame bar 32 on the rear side. Left and right ends of the first frame bar 31 and the second frame bar 32 are provided as fixed portions 31*a*, 31*a*, 32*a*, and 32*a*, respectively.

For example, four third frame bars 33, 33, . . . are provided apart from one another in the left-right direction. The third frame bars 33, 33 located on a leftmost side and a rightmost side are referred to as end bars 33X, 33X, and the third frame bars 33, 33 other than the end bars 33X, 33X are referred to as middle bars 33Y, 33Y.

Front end portions of the third frame bars 33 are respectively coupled to the coupling portions 34, and rear end portions of the third frame bars 33 are coupled to the second frame bar 32. Seat brackets 35, 35 are coupled to side surface portions of the middle bars 33Y, 33Y, respectively (see FIGS. 3 and 4). Each seat bracket 35 has an attachment hole 35*a* penetrating in the up-down direction.

Upper end portions of the coupling portions 34 are respectively coupled to lower end portions of the third frame bars 33, and lower end portions of the coupling portions 34 are coupled to an upper end portion of the first frame bar 31 (see FIG. 3).

In the battery frame 30, the fixed portions 31*a*, 31*a*, 32*a*, 32*a* of the first frame bar 31 and the second frame bar 32 are protruded laterally (outward) from the end bars 33X, 33X, respectively.

Upper end portions of coupling brackets 36, 36 are coupled to portions of the first frame bar 31 under front surface portions of the coupling portions 34, 34 to which the middle bars 33Y, 33Y are coupled, respectively. The coupling brackets 36 extend in the up-down direction, and are located at the same position as the middle bars 33Y, 33Y in the left-right direction.

Figure 5:
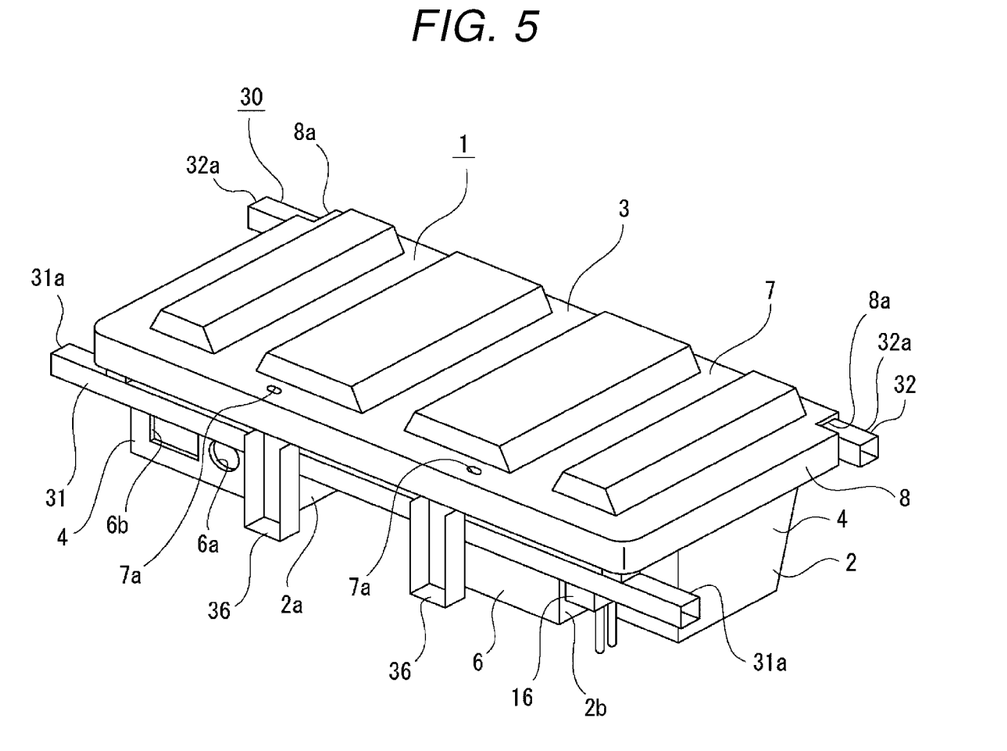
FIG. 5 is a perspective view illustrating the battery frame and the in-vehicle battery.

The in-vehicle battery 1 includes a housing case 2 formed in a box shape that is horizontally long and opened upward, a cover 3 covering an internal space of the housing case 2 from above, and necessary components disposed inside and outside the housing case 2 (see FIGS. 3 and 5).

The housing case 2 includes battery housing portions 4, 4 located apart from each other in the left-right direction and an intermediate portion 5 located between the battery housing portions 4, 4. The intermediate portion 5 is continuous with upper end portions of the battery housing portions 4, 4. Therefore, the housing case 2 includes a recess portion 2*a* under the intermediate portion 5. The recess portion 2*a* is opened forward, rearward and downward.

A terminal arrangement recess portion 2*b* is formed at one end portion in the left-right direction on a front surface side of the housing case 2. The terminal arrangement recess portion 2*b* is formed by bending a front surface portion 6 of the housing case 2, and is formed as a space opening to an outside in front and lateral directions.

The housing case 2 is attached to the battery frame in a suspended state by bolts or the like (not illustrated).

The cover 3 includes a top surface portion 7 oriented in the up-down direction and an outer peripheral surface portion 8 protruding downward from an outer peripheral edge of the top surface portion 7, and notches 8*a*, 8*a* are formed in rear end portions of left and right side portions of the outer peripheral surface portion 8. A front end portion of the top surface portion 7 has insertion holes 7*a*, 7*a* penetrating in the up-down direction and spaced apart from each other in the left-right direction.

The cover 3 is attached to the battery frame 30 in a state in which the second frame bar 32 is inserted into the notches 8*a*, 8*a* from below (see FIG. 5). Therefore, in a state in which the cover 3 is attached to the battery frame 30, a portion of the battery frame 30 excluding the fixed portions 32*a*, 32*a* of the second frame bar 32 and the third frame bars 33, 33, . . . are closed by the cover 3.

In this way, since the cover 3 is attached to the battery frame 30 in a state in which the second frame bar 32 is inserted into the notches 8*a*, 8*a*, the cover 3 is close to the housing case 2 in the up-down direction, which reduces a size of the in-vehicle battery 1 in the up-down direction.

In the state in which the cover 3 is attached to the battery frame 30, the insertion holes 7*a*, 7*a* formed in the top surface portion 7 of the cover 3 are located directly above the attachment holes 35*a*, 35*a* of the seat brackets 35, 35 fixed to the middle bars 33Y, 33Y, respectively.

Figure 6:
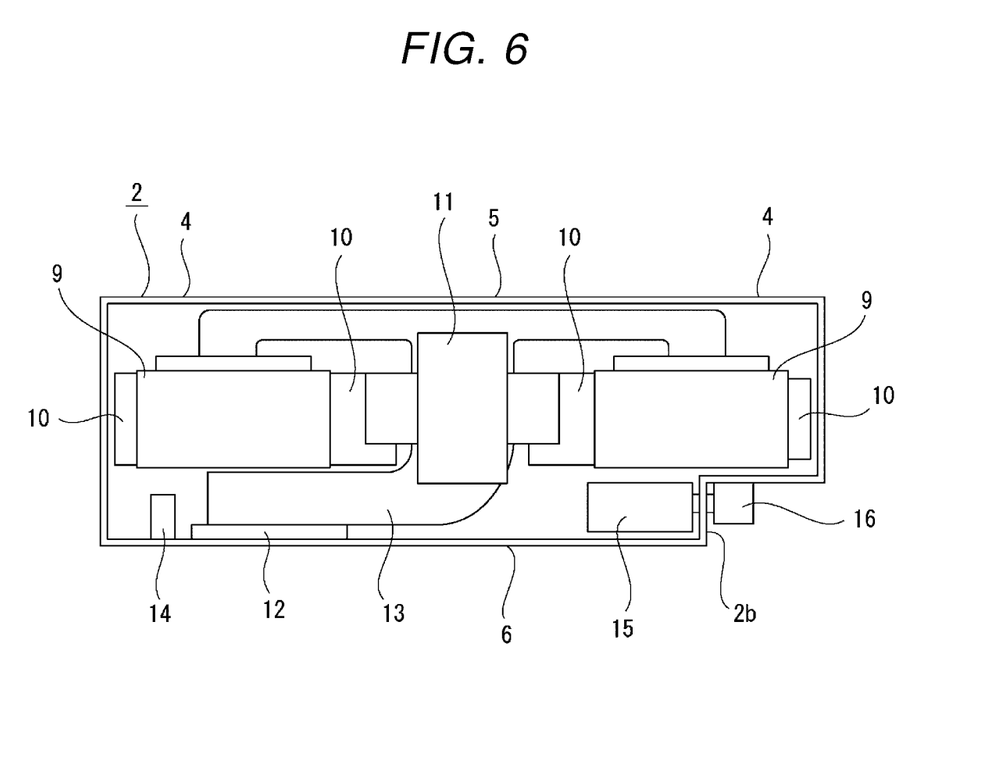
FIG. 6 is a plan view illustrating an internal structure of the in-vehicle battery.
Figure 7:
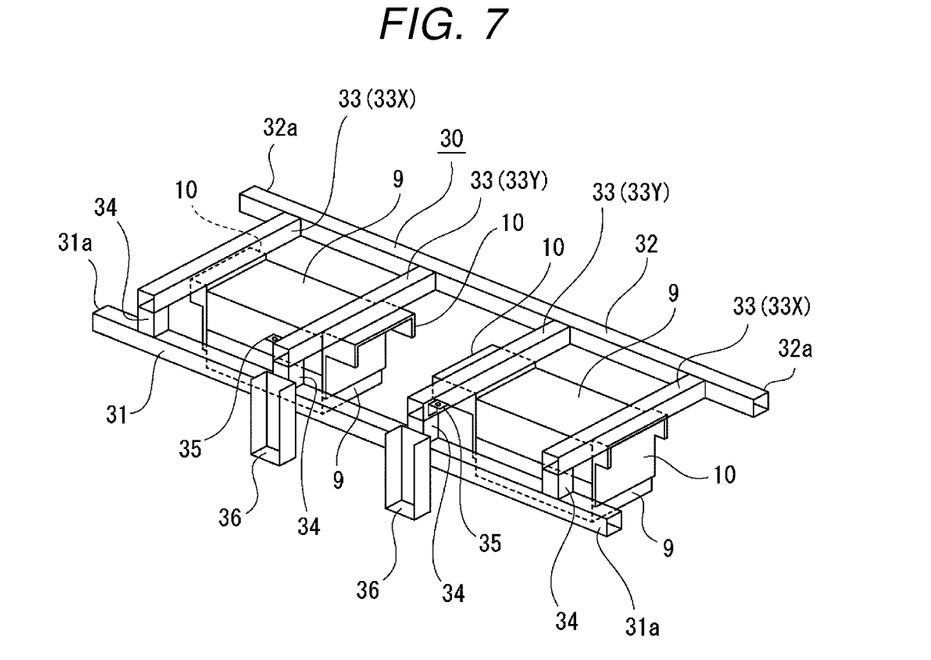
FIG. 7 is a perspective view illustrating a state in which battery modules are attached to the battery frame.

For example, two battery modules 9, 9, . . . are housed in each of the battery housing portions 4, 4 of the housing case 2 (see FIGS. 3 and 6). In each battery module 9, a plurality of secondary batteries such as nickel hydrogen battery and lithium ion battery are housed in a case portion. The battery modules 9 are housed in the battery housing portion 4 in, for example, two stages including an upper stage and a lower stage. The number of the battery modules 9 housed in the housing case 2 may be any number, as long as at least two battery modules 9 is housed in the battery housing portions 4, 4 formed in the housing case 2 in such a manner that the battery modules 9 are spaced apart from each other in the left-right direction.

Battery brackets 10, 10 are attached to left and right ends of the battery modules 9, 9 in two stages. Upper end portions of the battery brackets 10, 10 are attached to the third frame bars 33, 33 of the battery frame 30, respectively (see FIG. 7). Therefore, the battery modules 9, 9 are attached to the battery frame 30 in a suspended state via the battery brackets 10, 10.

A battery control unit 11 is disposed on the intermediate portion 5 of the housing case 2 (see FIGS. 3 and 6). The battery control unit 11 is a control device that controls each component of the in-vehicle battery 1, and is attached in a state of straddling the two battery brackets 10, 10.

A cooling fan 12 is attached to an inner surface of the front surface portion 6 in the battery housing portion 4 of the housing case 2. A cooling air intake hole 6*a* is formed in a portion of the front surface portion 6 where the cooling fan 12 is attached (see FIGS. 3, 6, and 8). The cooling air intake hole 6*a* is a hole through which cooling air is taken in from an outside of the housing case 2. The cooling air intake hole 6*a* is covered with a filter (not illustrated) attached to the front surface portion 6. Therefore, the cooling air intake hole 6*a* also serves as a work portion for performing an operation of attaching the filter.

Figure 8:
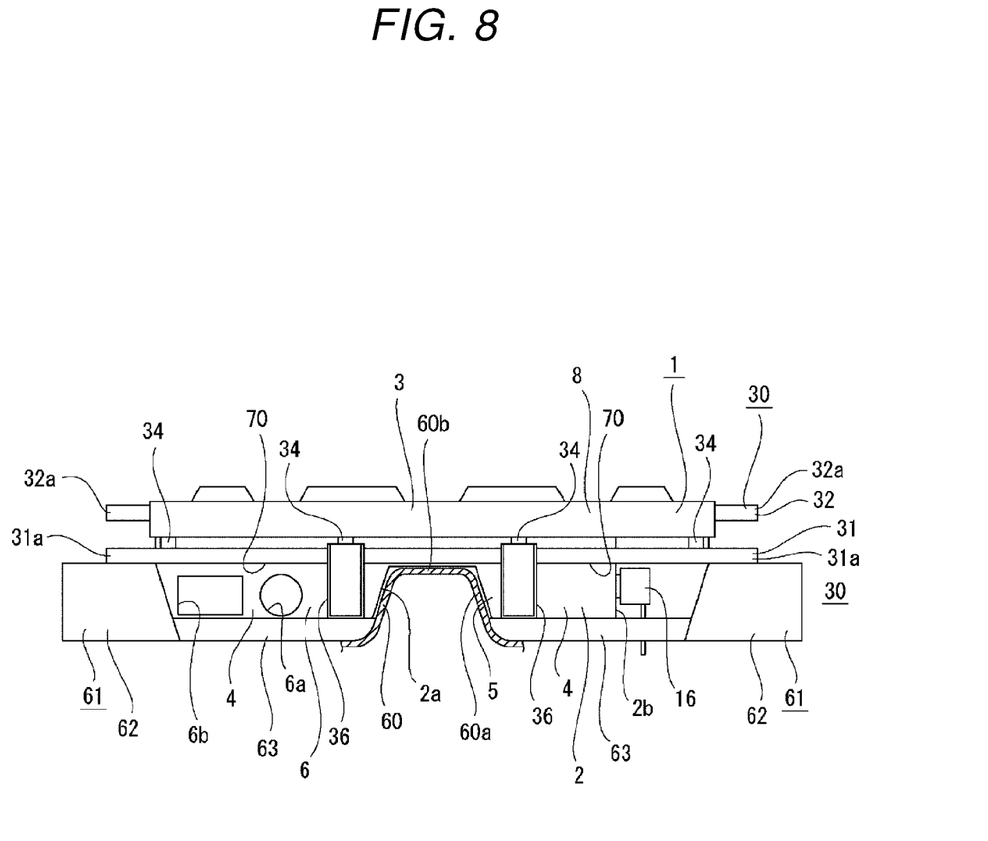
FIG. 8 is a front view illustrating a state in which the battery frame to which the in-vehicle battery is attached is fixed to the vehicle body, with a part thereof illustrated as a cross section.

A cooling duct 13 is coupled to the cooling fan 12. The cooling duct 13 passes through a lower surface side of the battery control unit 11 and is then branched in the left-right direction, branched portions of which are coupled to the battery modules 9, 9 . . . . Accordingly, the cooling air taken in from the cooling air intake hole 6*a* flows toward the battery modules 9, 9 . . . through the cooling duct 13 by the cooling fan 12 to cool the batteries of the battery modules 9, 9, . . . , and is discharged outside the housing case 2 from a cooling air discharge hole (not shown). At this time, a part of the cooling air passing through the cooling duct 13 is simultaneously blown to the other parts such as the battery control unit 11, and the other parts such as the battery control unit 11 are also cooled by the blown cooling air.

A service plug 14 is attached to the inner surface of the front surface portion 6 of the battery housing portion 4 of the housing case 2. A plug working hole 6*b* is formed in a portion of the front surface portion 6 where the service plug 14 is attached. The service plug 14 has, for example, a function of interrupting or coupling a high-voltage circuit in order to prevent an electric shock of an operator at a time of inspection and maintenance of the vehicle 100 or at a time of a collision toward the vehicle 100. The service plug 14 is pulled out and taken out at the time of inspection and maintenance of the vehicle or at the time of the collision toward the vehicle, the high-voltage circuit is cut off by the service plug 14 being taken out, thereby preventing the electric shock of the operator.

The plug working hole 6*b* is a working hole for performing work on the service plug 14, and also serves as a work portion for performing work on the service plug 14. The plug working hole 6*b* is covered with a plug cover (not illustrated) attached to the front surface portion 6.

A junction box 15 is disposed on an inner surface side of the battery housing portion 4 of the housing case 2. A connector 16 is disposed in the terminal arrangement recess portion 2*b* of the housing case 2. The connector 16 is coupled to the junction box 15 and serves as a connection terminal unit of the junction box 15. The junction box 15 serves as a control device that controls the battery modules 9, 9 . . . and the like.

The connector 16 is a portion to which a coupling line (not illustrated) is coupled, and also serves as a work portion for performing work of coupling the coupling line.

Fixed State of Battery Frame to Vehicle Body

Figure 9:
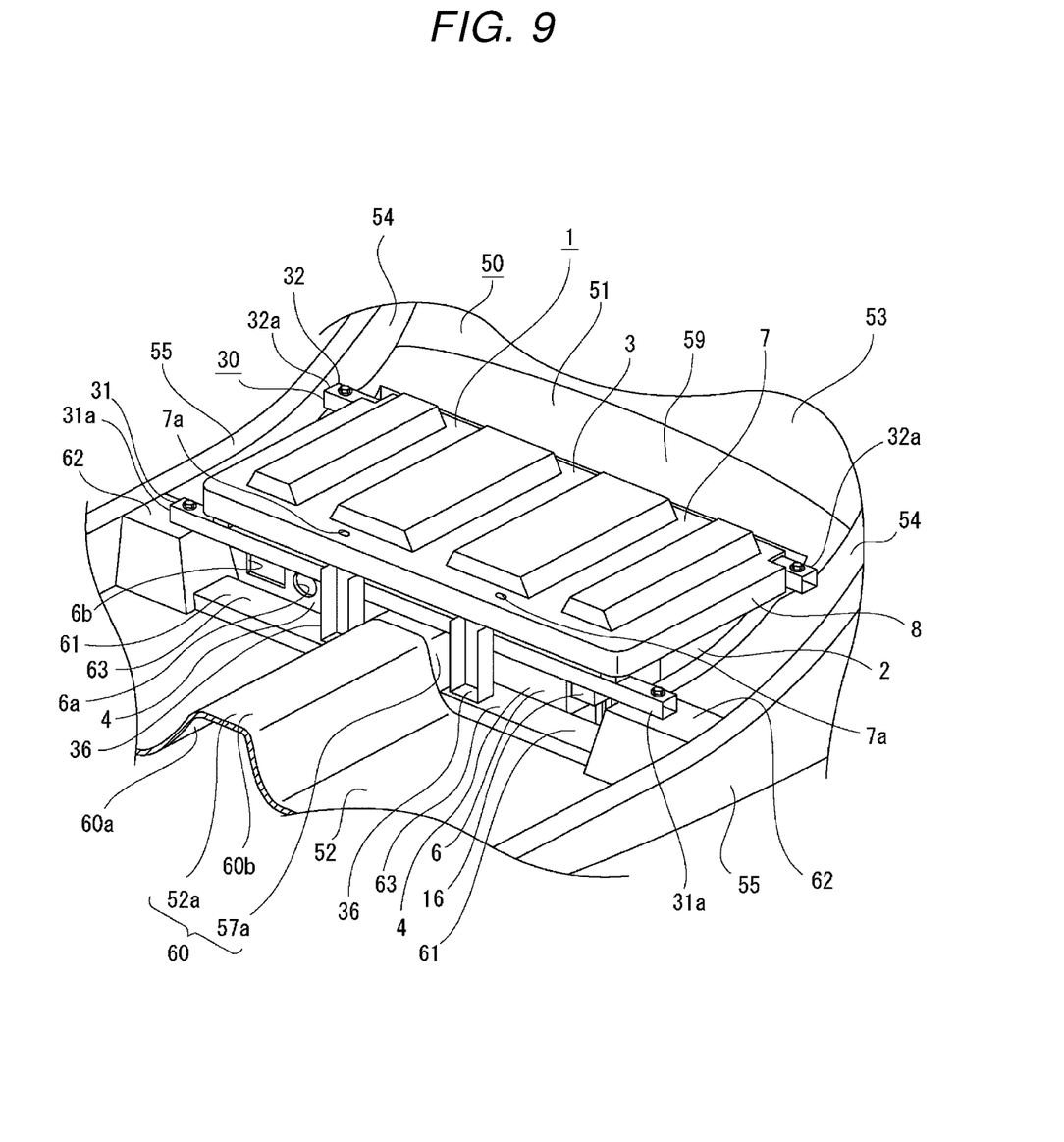
FIG. 9 is a perspective view illustrating a state in which the battery frame to which the in-vehicle battery is attached is fixed to the vehicle body.

In the battery frame 30 to which the in-vehicle battery 1 configured as described above is attached, the fixed portions 31*a*, 31*a*, 32*a*, 32*a* of the first frame bar 31 and the second frame bar 32 are fixed to the vehicle body 50 by bolts or the like (see FIG. 9). The fixed portions 31*a*, 31*a* on a front side are fixed to front end portions of the side frames 54 or the base portions 62 of the cross members 61, and the fixed portions 32*a*, 32*a* on a rear side are fixed to the side frames 54. In the battery frame 30, a center portion of the first frame bar 31 in the left-right direction is also fixed to an upper surface portion 60*b* of the raised portion 60 by bolts or the like.

Lower end portions of the coupling brackets 36, 36 coupled to the battery frame 30 are fixed to the front portions 63, 63 of the cross members 61 by bolts or the like. Therefore, the battery frame 30 is fixed to the cross members 61, 61, which constitute a part of the vehicle body 50, via the coupling brackets 36, 36.

In this way, the battery frame 30 is fixed to the cross members 61, 61 via the coupling brackets 36, 36, which exist at the same positions as the middle bars 33Y, 33Y in the left-right direction. Thereby, efficiency for transmitting a load applied to the battery frame 30 to the vehicle body 50 in the event of a collision, particularly a collision in the front-rear direction, is improved. Therefore, safety in the event of a collision, particularly a collision from the front-rear direction can be improved.

In the state in which the battery frame 30 is fixed to the vehicle body 50 as described above, the in-vehicle battery 1 is inserted into the arrangement recessed portion 56 formed in the floor pan 51. In the in-vehicle battery 1, the raised portion 60 is inserted into the recess portion 2*a* of the housing case 2, the battery housing portions 4, 4 of the housing case 2 are respectively located in the first portions 56*a*, 56*a* of the arrangement recessed portion 56 formed in the floor pan 51, and the intermediate portion 5 of the housing case 2 is located directly above the raised portion 60 in the second portion 56*b* of the arrangement recessed portion 56 formed in the floor pan 51.

Figure 10:
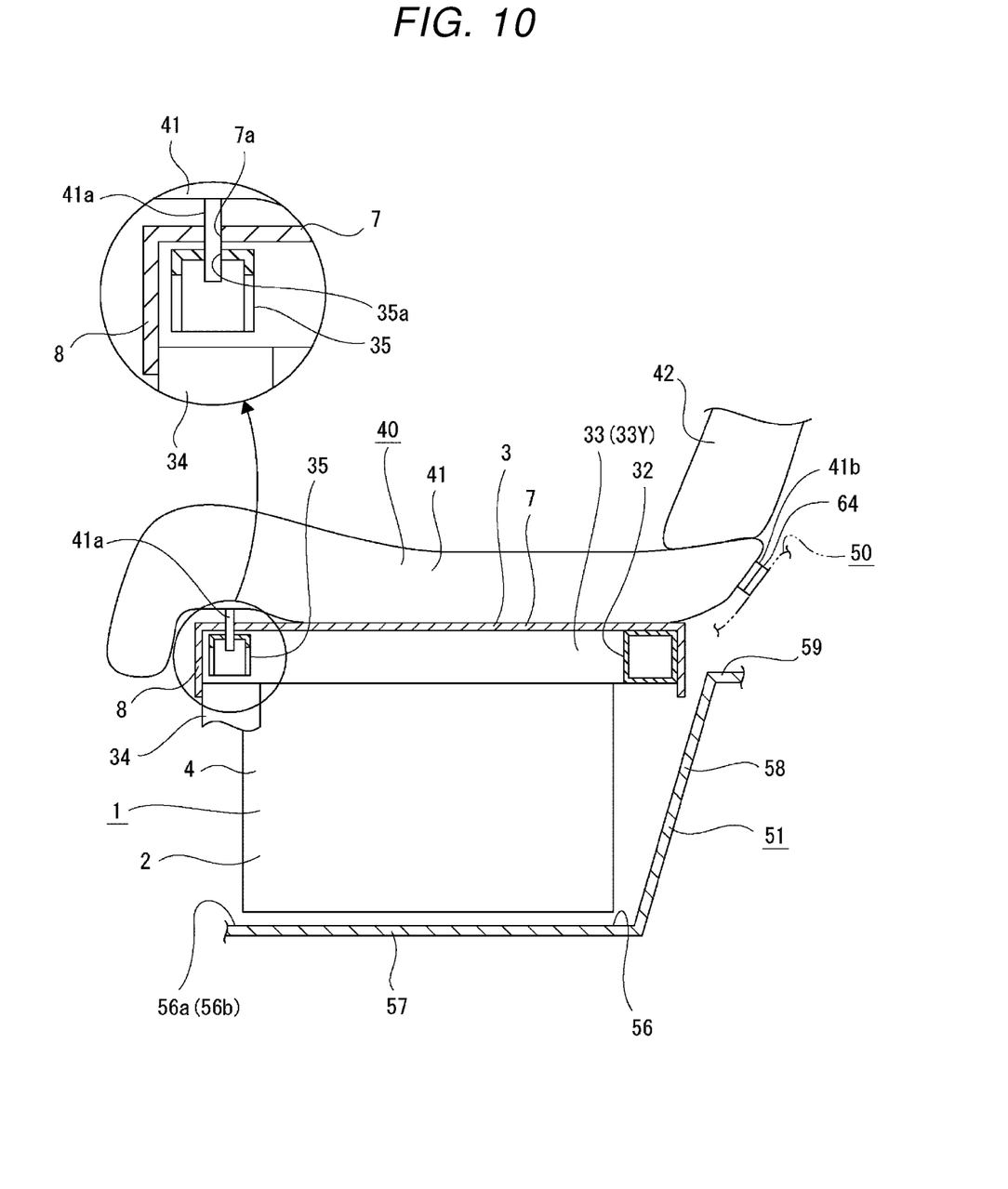
FIG. 10 is a side view illustrating a state in which a rear seat is attached in a state in which the battery frame to which the in-vehicle battery is attached is fixed to the vehicle body, with a part thereof illustrated as a cross section.

In the state in which the battery frame 30 is fixed to the vehicle body 50, the housing case 2 of the in-vehicle battery 1 attached to the battery frame 30 is separated upward from the bottom surface portion 57 of the floor pan 51 (see FIG. 10). At this time, in the in-vehicle battery 1, the cooling air intake hole 6*a*, the plug working hole 6*b*, and the connector 16, which serve as the work portions, are located above the front portions 63, 63 of the cross members 61 (see FIG. 8). Spaces are formed between the first frame bar 31 of the battery frame 30 and the front portions 63, 63 of the cross members 61, 61, and these spaces serve as access spaces 70, 70.

Since the access spaces 70, 70 communicate with the cooling air intake hole 6*a*, the plug working hole 6*b*, and the connector 16, which serve as the work portions, the operator can perform various types of work through the access spaces 70, 70. The operator can, for example, attach or replace the filter covering the cooling air intake hole 6*a*. Further, the operator can, for example, attach or replace the plug cover covering the plug working hole 6*b*, and can perform various types of work on the service plug 14. Further, the operator can, for example, couple or replace the coupling line on the connector 16.

As described above, in the state in which the battery frame 30 is fixed to the vehicle body 50, a rear seat 40 is attached to the battery frame 30 and the vehicle body 50 (see FIG. 10). The rear seat 40 includes a seat cushion 41 on which the occupant sits and a backrest 42 serving as a back upholstery.

In the seat cushion 41, front attached portions 41*a*, 41*a* protruding downward from a lower surface are provided to be spaced apart from each other in the left-right direction at positions close to a front end, and rear attached portions 41*b*, 41*b* protruding substantially rearward are provided to be spaced apart from each other in the left-right direction at a rear end portion. The vehicle body 50, for example, the side frames 54, 54 are provided with attachment pieces 64, 64, respectively. The front attached portions 41*a*, 41*a* of the rear seat 40 are inserted into the insertion holes 7*a*, 7*a* of the cover 3, respectively, and inserted into and engaged with the attachment holes 35*a*, 35*a* of the seat brackets 35, 35 fixed to the middle bars 33Y, 33Y, respectively. The rear attached portions 41*b*, 41*b* of the rear seat 40 are engaged with the attachment pieces 64, 64, respectively.

In this way, the rear seat 40 is attached to the battery frame 30 and the vehicle body 50 by the front attached portions 41*a*, 41*a* being inserted into and engaged with the attachment holes 35*a*, 35*a* of the seat brackets 35, 35, respectively, and the rear attached portions 41*b*, 41*b* being engaged with the attachment pieces 64, 64, respectively. Therefore, the battery frame 30 serves as an attachment unit for the in-vehicle battery 1 to which the in-vehicle battery 1 is attached, and also serves as an attachment unit for the rear seat 40 to which the rear seat 40 is attached.

In a state in which the rear seat 40 is attached to the battery frame 30 and the vehicle body 50, the in-vehicle battery 1 is disposed under the seat cushion 41 of the rear seat 40.

CONCLUSION

As described above, the attachment structure for the in-vehicle battery 1 is located under the rear seat 40, and includes: at least two battery modules 9 that are located apart from each other in the left-right direction; the housing case 2 that houses the battery modules 9; and the battery frame 30 to which the battery modules 9 and the housing case 2 are attached in a suspended state, the battery frame 30 being fixed to the vehicle body 50. The rear seat 40 is attached to the battery frame 30.

Therefore, the in-vehicle battery 1 and the rear seat 40 are attached to the battery frame 30 fixed to the vehicle body 50, and in the event of a collision or the like, the load on the in-vehicle battery 1 and the occupant is reduced by the battery frame 30. At the same time, since both the in-vehicle battery 1 and the rear seat 40 are attached to the battery frame 30, it is possible to enhance a function of protecting the in-vehicle battery 1 and the occupant can be enhanced, and to simplify the structure.

Further, since the battery frame 30 has a function of attaching both the in-vehicle battery 1 and the rear seat 40, it is not necessary to provide separate members for attaching the in-vehicle battery 1 and the rear seat 40. Therefore, a weight of the vehicle 100 can be reduced, which improves a fuel economy performance.

In the configuration in which the in-vehicle battery 1 is disposed under the rear seat 40, when the occupant or the like spills water in a vehicle cabin, the spilled water may flow under the rear seat 40 and reach the in-vehicle battery 1. If the water flowing under the rear seat 40 reaches the in-vehicle battery 1 and flows into the housing case 2 or adheres to the connector 16 or the like, normal operations of the in-vehicle battery 1 may be hindered. Therefore, it is also necessary to ensure a good waterproof performance for the in-vehicle battery 1.

In the attachment structure of the in-vehicle battery 1, as described above, the in-vehicle battery 1 is suspended from the battery frame 30, so that the in-vehicle battery 1 can be separated upward from the bottom surface portion 57 of the floor pan 51. The water is unlikely to be attached to the in-vehicle battery 1, which ensures good waterproof performance of the in-vehicle battery 1 and a normal operation state of the in-vehicle battery 1.

The center portion of the vehicle body 50 in the left-right direction is provided with the raised portion 60 protruding upward. The at least two battery modules 9 are disposed such that the battery modules 9 are located on left and right sides of the raised portion 60. The battery frame 30 is fixed to the raised portion 60.

Therefore, since the battery frame 30 is fixed to the raised portion 60 and the battery modules 9 is located at positions without interfering with the raised portion 60, a strength of the battery frame 30 can be increased and an arrangement space of the battery modules 9 can be effectively utilized.

Left and right ends of the battery frame 30 are fixed to the pair of side frames 54, 54, respectively.

Therefore, since the battery frame 30 is fixed to the left and right ends of the vehicle body 50, the vehicle body 50 is reinforced in the left-right direction by the battery frame 30, and the occupant and the in-vehicle battery 1 can be protected when an impact is received from lateral sides.

The work portions for performing work on each component are formed in the in-vehicle battery 1. The access spaces 70 communicating with the work portions are formed between the rear seat 40 and the cross members 61.

Therefore, work can be performed on each component formed in the in-vehicle battery 1 via the access spaces 70 and the work portions without detaching the rear seat 40 or the battery frame 30 from the vehicle body 50, and workability and maintainability can be improved.

The cross members 61 are located in front of the housing case 2. Portions of the cross members 61 located in front of the work portions are provided as the front portions 63, 63. Upper surfaces of the front portions 63, 63 are located below the work portions.

Therefore, since the water flowing into the lower side of the housing case 2 can flow forward beyond the front portions 63, 63 without reaching the work portions, it is possible to effectively prevent the water from adhering to the work portions and entering the inside of the housing case 2.

Further, since the waterproof performance for the in-vehicle battery 1 is ensured by the configuration in which the upper surfaces of the front portions 63 of the cross members 61 for reinforcing the vehicle body 50 are located below the work portions, it is not necessary to provide a dedicated member for ensuring the waterproof performance for the in-vehicle battery 1, which ensures excellent waterproof performance of the in-vehicle battery 1 while simplifying the structure and reducing the manufacturing cost.

In the configuration in which the front portions 63 of the cross members 61 are located below the work portions, a height of the front portions 63 is low, which decreases the strength of the vehicle body 50. However, in the vehicle 100, as described above, the center portion of the first frame bar 31 of the battery frame 30 in the left-right direction is fixed to the upper surface portion 60b of the raised portion 60 by bolts or the like.

Therefore, even when the height of the front portions is low and the strength of the vehicle body 50 is decreased, the strength of the vehicle body 50 is increased by the first frame bar 31, which can ensure sufficient strength of the vehicle body 50 and improve safety against collision.

ADDENDUM

Since vibration or the like occurs during traveling of the vehicle 100, the water flowing below the housing case 2 may splash up and adhere to the housing case 2 when the water flows beyond the front portions 63 of the cross members 61. Therefore, in order to prevent the water from adhering to the housing case 2 due to the water splashing up, a water shielding plate 17 protruding forward from the front surface portion 6 may be provided in the housing case 2 (see FIG. 11). It is desirable that the water shielding plate 17 is provided, for example, below each of the cooling air intake hole 6a, the plug working hole 6b, and the connector 16, which serve as the work portions.

Figure 11:
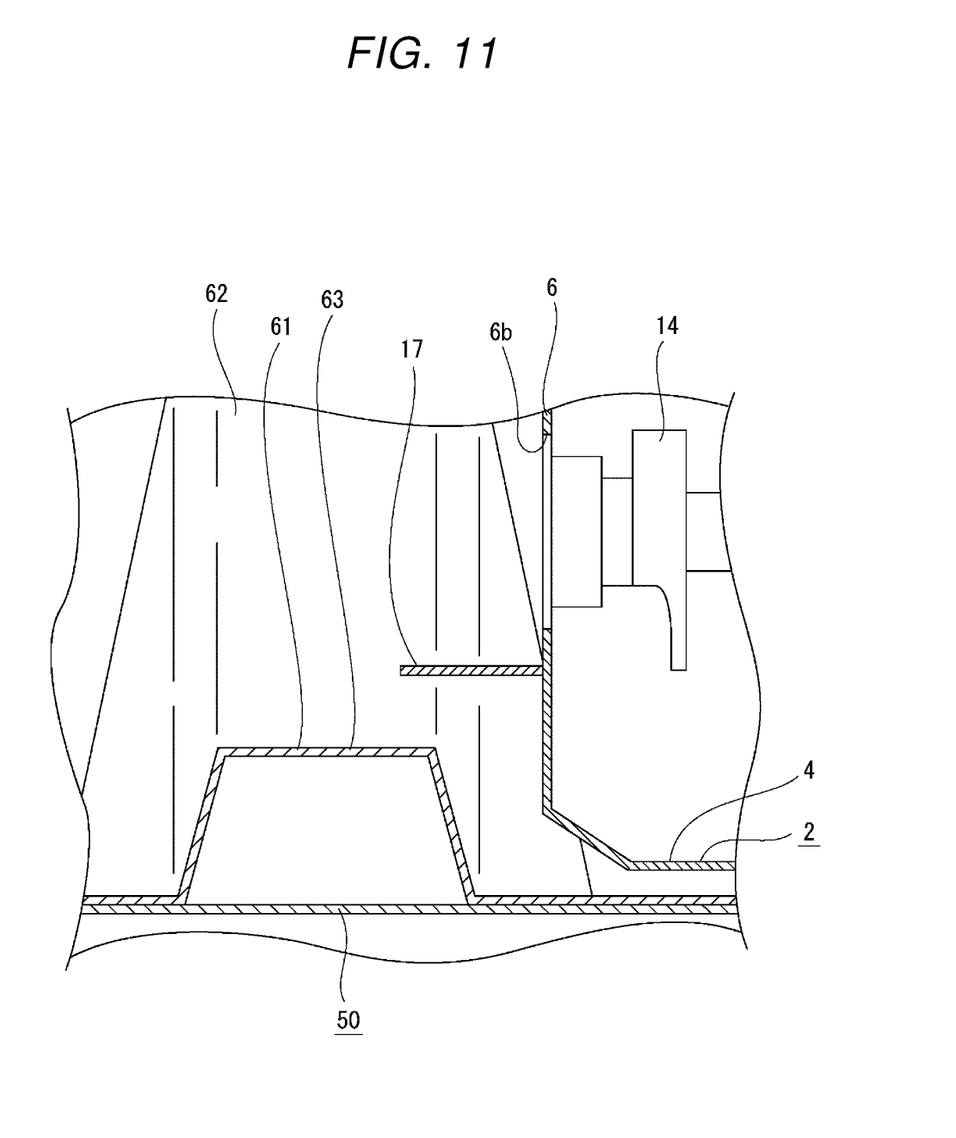
FIG. 11 is a side view illustrating a configuration in which a water shielding plate is attached to a housing case, with a part thereof illustrated as a cross section.

By providing such a water shielding plate 17, the adhesion of the water to the work portions and entry of the water into the housing case 2 can be prevented more effectively.

Figure 12:
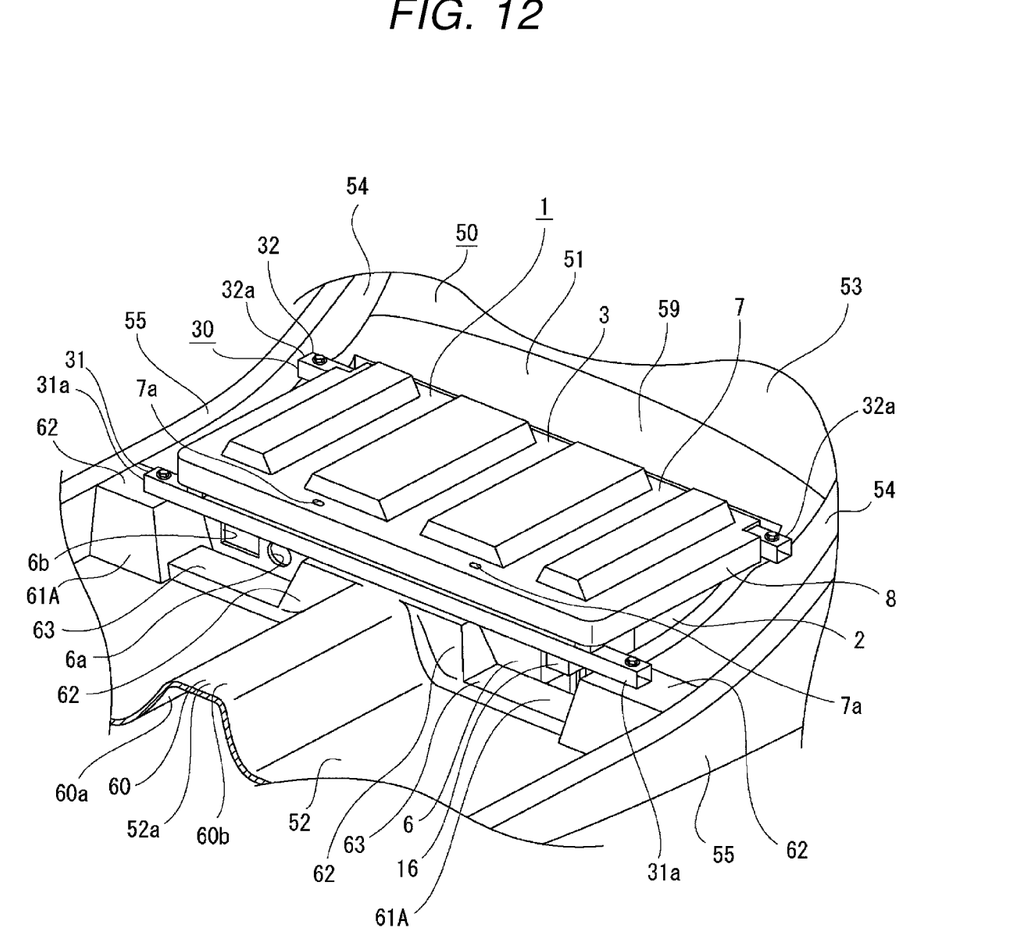
FIG. 12 is a perspective view illustrating a configuration in which another cross member is used.

In the vehicle 100, instead of the cross members 61, cross members 61A can be used whose both left and right ends are provided as base portions 62, 62 (see FIG. 12).

Left and right ends of the cross members 61A are provided as the base portions 62, 62. Portions between the base portions 62, 62 are provided as the front portions 63. Upper surfaces of the base portions 62, 62 are higher than upper surfaces of the front portions 63, and the base portions 62, 62 have substantially the same height.

If the cross members 61A, 61A are used, the first frame bar 31 of the battery frame 30 is fixed to the base portions 62, 62 adjacent to the raised portion 60 by bolts or the like. Further, in this case, the center portion of the first frame bar 31 in the left-right direction provided in the battery frame 30 may be fixed to the upper surface portion 60b of the raised portion 60 by bolts or the like. Therefore, if the cross members 61A, 61A are used, portions of the first frame bar 31 other than the fixed portions 31a, 31a are fixed to the vehicle body 50 at two or three positions.

In this way, if the cross members 61A, 61A are used, since the strength of the vehicle body 50 is increased by the base portions 62, 62, it is not necessary to provide the coupling brackets 36, and the strength of the vehicle body 50 can be improved while reducing the number of components.

In the structure in which the cross members 61A are used, the cross members 61A are manufactured as one single component by coupling the base portions 62, 62 adjacent to the raised portion 60, whereby the number of components can be reduced and the manufacturing cost can be reduced.

The invention claimed is:

1. An in-vehicle battery attachment structure to be applied to a vehicle, the in-vehicle battery attachment structure being to be disposed under a rear seat of the vehicle, the in-vehicle battery attachment structure comprising:
    at least one left battery module and at least one right battery module, the at least one left battery module and the at least one right battery module being to be disposed apart from each other in a left-right direction of the vehicle;
    a housing case that houses the at least one left battery module and the at least one right battery module; and
    a battery frame to which the at least one left battery module, the at least one right battery module, and the housing case are attached in a suspended state, the battery frame being to be fixed to a vehicle body of the vehicle,
    wherein the rear seat is directly attached to the battery frame,
    further comprising a cover attached to the battery frame,
    wherein the cover covers an internal space of the housing case from above,
    wherein the cover includes an insertion hole penetrating through the cover in an up-down direction,
    wherein the battery frame includes a seat bracket having an attachment hole penetrating in the up-down direction,
    wherein the rear seat includes a front attached portion protruding downward in the up-down direction from a lower surface of the rear seat, and
    wherein the front attached portion of the rear seat extends through the insertion hole of the cover, into the attachment hole of the battery frame, and engages with the attachment hole to fix the rear seat to the battery frame.

2. The in-vehicle battery attachment structure according to claim 1, wherein
    the vehicle body is provided with a left side frame and a right side frame, the left side frame and the right side frame being spaced apart from each other in the left-right direction, and
    a left end and a right end of the battery frame are fixed respectively to the left side frame and the right side frame.

3. The in-vehicle battery attachment structure according to claim 1, wherein
    a center portion of the vehicle body in the left-right direction is provided with a raised portion protruding upward,
    the at least one left battery module and the at least one right battery module are disposed such that the at least one left battery module and the at least one right battery module are located respectively on a left and a right side of the raised portion, and
    the battery frame is fixed to the raised portion.

4. The in-vehicle battery attachment structure according to claim 2, wherein
    a center portion of the vehicle body in the left-right direction is provided with a raised portion protruding upward,
    the at least one left battery module and the at least one right battery module are disposed such that the at least one left battery module and the at least one right battery module are located respectively on a left and a right side of the raised portion, and
    the battery frame is fixed to the raised portion.

5. The in-vehicle battery attachment structure according to claim 1, wherein
    the vehicle body is provided with a cross member,
    at least the housing case has a work portion that allows work to be performed on a component disposed therein, and
    an access space communicating with the work portion is formed between the battery frame and the cross member.

6. The in-vehicle battery attachment structure according to claim 2, wherein
    the vehicle body is provided with a cross member,
    at least the housing case has a work portion that allows work to be performed on a component disposed therein, and
    an access space communicating with the work portion is formed between the battery frame and the cross member.

7. The in-vehicle battery attachment structure according to claim 3, wherein
    the vehicle body is provided with a cross member,
    at least the housing case has a work portion that allows work to be performed on a component disposed therein, and
    an access space communicating with the work portion is formed between the battery frame and the cross member.

8. The in-vehicle battery attachment structure according to claim 4, wherein
    the vehicle body is provided with a cross member,
    at least the housing case has a work portion that allows work to be performed on a component disposed therein, and
    an access space communicating with the work portion is formed between the battery frame and the cross member.

9. The in-vehicle battery attachment structure according to claim 5, wherein
    the cross member is located in front of the housing case,
    the cross member comprises a front portion located in front of the work portion, and
    an upper surface of the front portion is located below the work portion.

10. The in-vehicle battery attachment structure according to claim 6, wherein
    the cross member is located in front of the housing case,
    the cross member comprises a front portion located in front of the work portion, and
    an upper surface of the front portion is located below the work portion.

11. The in-vehicle battery attachment structure according to claim 7, wherein
    the cross member is located in front of the housing case,
    the cross member comprises a front portion located in front of the work portion, and
    an upper surface of the front portion is located below the work portion.

12. The in-vehicle battery attachment structure according to claim 8, wherein
    the cross member is located in front of the housing case,
    the cross member comprises a front portion located in front of the work portion, and
    an upper surface of the front portion is located below the work portion.

13. An in-vehicle battery attachment structure to be applied to a vehicle, the in-vehicle battery attachment structure being to be disposed under a rear seat of the vehicle, the in-vehicle battery attachment structure comprising:
- at least one left battery module and at least one right battery module, the at least one left battery module and the at least one right battery module being to be disposed apart from each other in a left-right direction of the vehicle;
- a housing case that houses the at least one left battery module and the at least one right battery module; and
- a battery frame to which the at least one left battery module, the at least one right battery module, and the housing case are attached in a suspended state, the battery frame being to be fixed to a vehicle body of the vehicle,
- wherein the rear seat is directly attached to the battery frame,
- further comprising a cover attached to the battery frame,
- wherein the cover covers an internal space of the housing case from above,
- wherein the cover includes insertion holes with each penetrating through the cover in an up-down direction,
- wherein the battery frame includes seat brackets with each having an attachment hole penetrating in the up-down direction,
- wherein the rear seat includes front attached portions each protruding downward in the up-down direction from a lower surface of the rear seat,
- wherein a first of the front attached portions of the rear seat extends through a first of the insertion holes of the cover, into the attachment hole of a first seat bracket of the seat brackets of the battery frame, and engages with the attachment hole of the first seat bracket of the seat brackets of the battery frame to fix the rear seat to the battery frame, and
- wherein a second of the front attached portions of the rear seat extends through a second of the insertion holes of the cover, into the attachment hole of a second seat bracket of the seat brackets of the battery frame, and engages with the attachment hole of the second seat bracket of the seat brackets of the battery frame to fix the rear seat to the battery frame.

14. The in-vehicle battery attachment structure according to claim 1, wherein a portion of the rear seat contacts a portion of the battery frame.

15. The in-vehicle battery attachment structure according to claim 1, wherein a portion of the rear seat extends inside of the battery frame.

16. The in-vehicle battery attachment structure according to claim 1, wherein the battery frame includes a seat bracket, and
- wherein the rear seat is directly attached to the battery frame via the seat bracket.

17. An in-vehicle battery attachment structure to be applied to a vehicle, the in-vehicle battery attachment structure being to be disposed under a rear seat of the vehicle, the in-vehicle battery attachment structure comprising:
- at least one left battery module and at least one right battery module, the at least one left battery module and the at least one right battery module being to be disposed apart from each other in a left-right direction of the vehicle;
- a housing case that houses the at least one left battery module and the at least one right battery module;
- a battery frame to which the at least one left battery module, the at least one right battery module, and the housing case are attached in a suspended state, the battery frame being to be fixed to a vehicle body of the vehicle; and
- a cover attached to the battery frame, the cover covering an internal space of the housing case from above,
- wherein a portion of the rear seat contacts the battery frame.

18. The in-vehicle battery attachment structure according to claim 17, wherein the battery frame includes a seat bracket, and
- wherein the rear seat is directly attached to the battery frame via the seat bracket.

* * * * *